Aug. 10, 1954     W. W. MARTIN     2,685,863
SELF-DUMPING MONORAIL LIVE STOCK FEED DISPENSER
Filed July 29, 1950     3 Sheets-Sheet 1
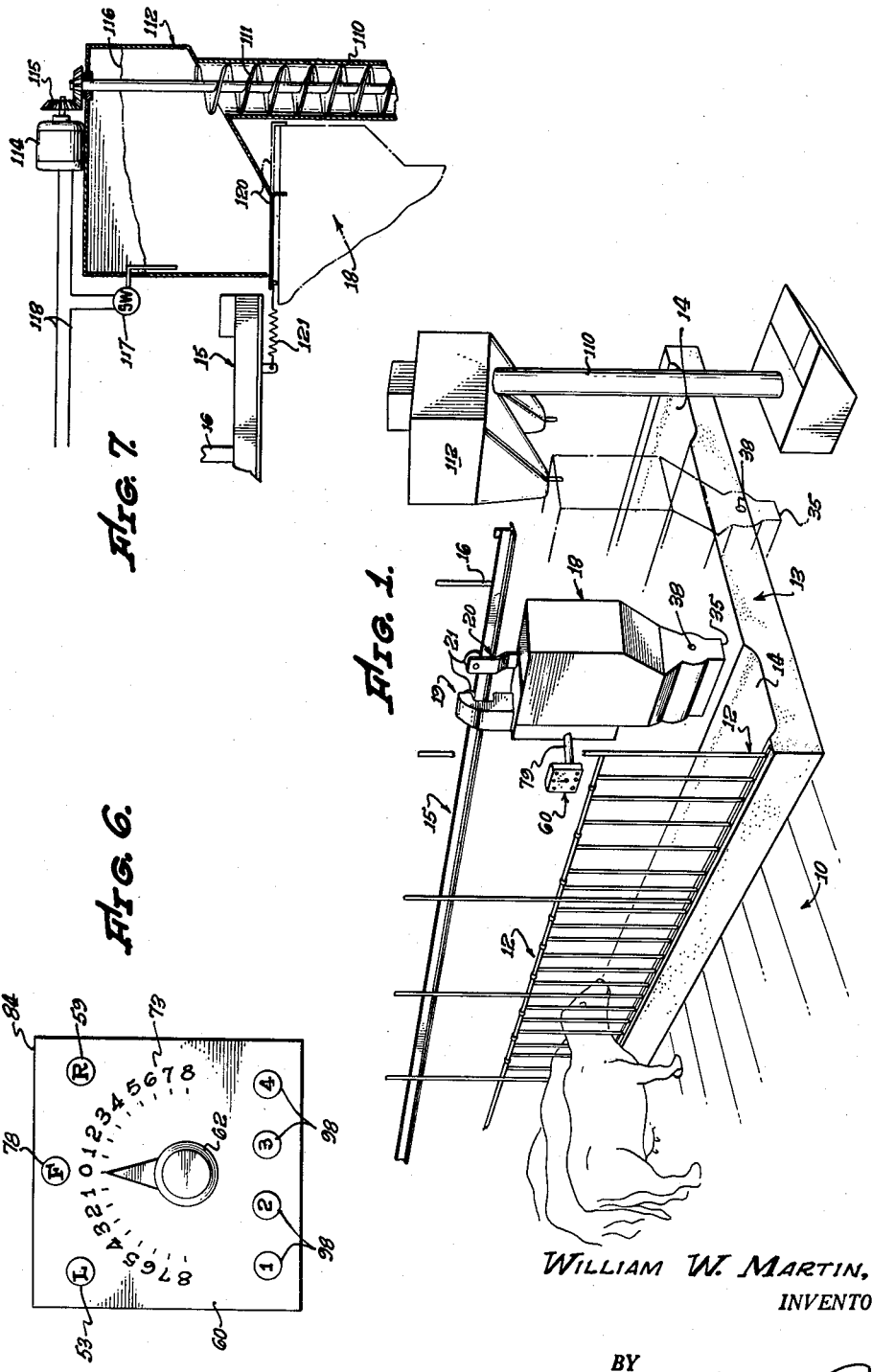
WILLIAM W. MARTIN,
INVENTOR.
BY
ATTORNEYS.

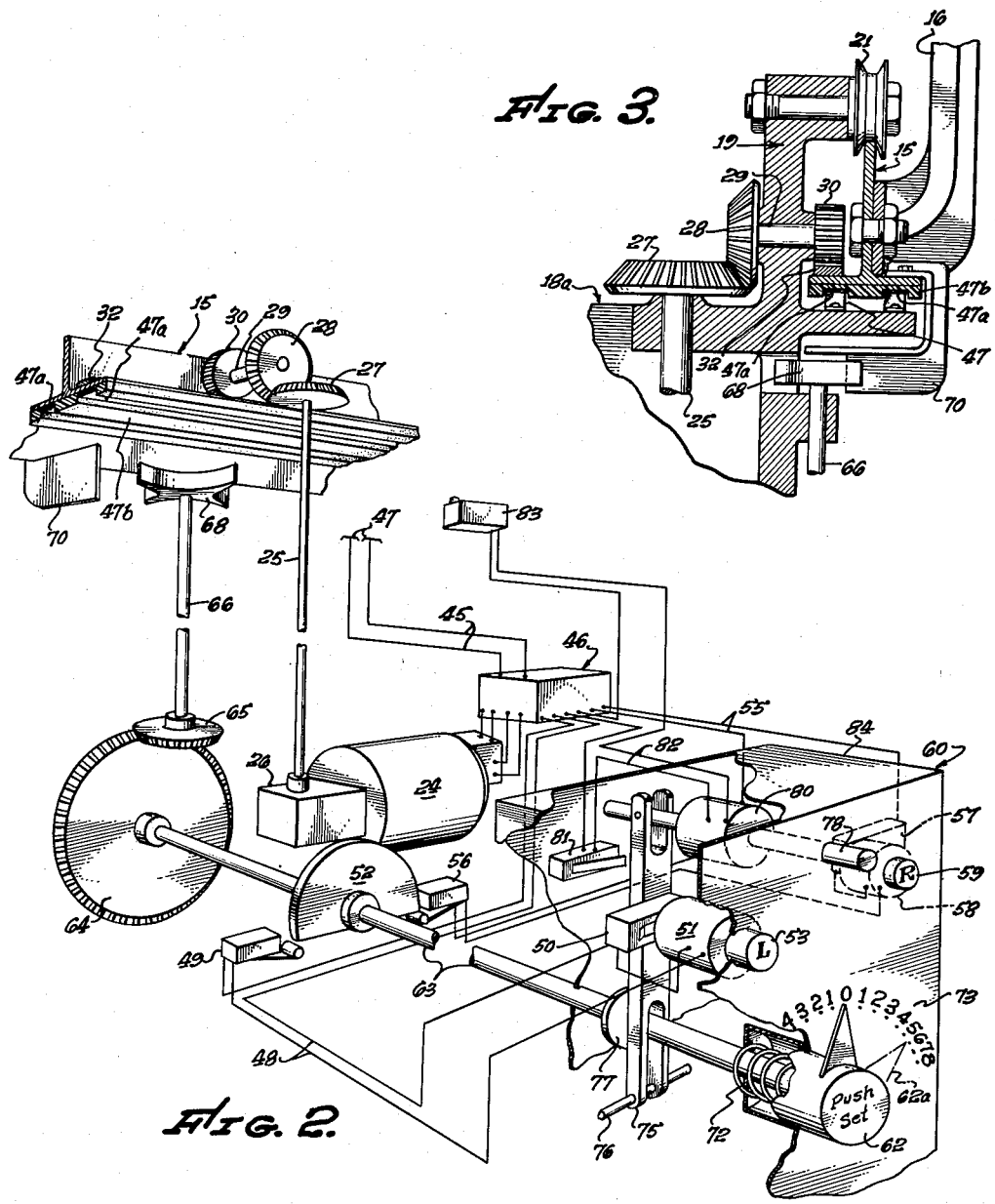

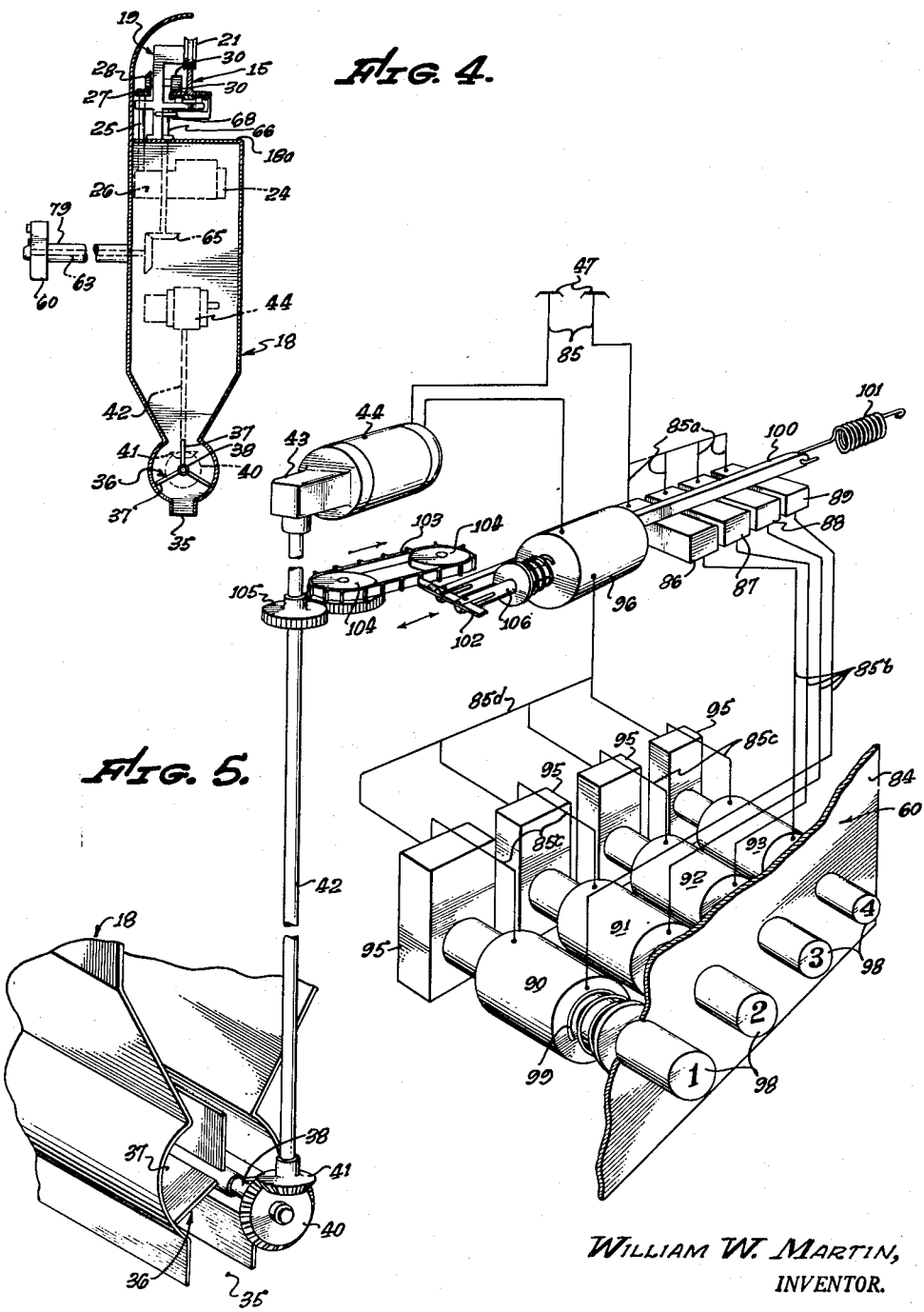

Patented Aug. 10, 1954

2,685,863

UNITED STATES PATENT OFFICE 2,685,863

SELF-DUMPING MONORAIL LIVE STOCK FEED DISPENSER

William W. Martin, Long Beach, Calif., assignor to Pacific Dairy Machinery Co., a corporation of California Application July 29, 1950, Serial No. 176,693

10 Claims. (Cl. 119—51)

1

The present invention relates generally to devices for handling feed for live stock, and more particularly to a dispenser adapted to travel along a row of stalls and discharge a predetermined amount of feed automatically at any selected stall, the dispenser moving from stall to stall as desired by the operator in order to distribute feed to a plurality of head of live stock.

When cows are milked in dairies, it is the usual practice to bring them into barns having a number of individual stalls. These stalls are usually, though not necessarily, arranged in straight rows. During the milking, the cows occupy individual stalls, although any given cow may not always occupy the same stall at different milking periods. As the cows are milked, it is the usual practice to feed them; and this has been done customarily by manual means.

An attendant fills a wheelbarrow with feed which he distributes to the individual cows by means of a shovel. If the attendant also operates the milking machine, it is necessary for him to move the wheelbarrow along behind the cows and to carry the shovel full of feed between the cows to place it in the feed trough where the cow can reach the feed. This is obviously an awkward and time-consuming procedure. On the other hand, if the attendant moves the wheelbarrow in front of the cows he is then on the opposite side of the stanchions and feed trough from the milking machines and he cannot attend to these machines.

Another difficulty encountered with the manual feeding method is that the most economical use of the feed is not made. There is inevitably a certain amount of wastage in the normal handling and spillage; and the latter is especially hard to prevent since the attendant is ordinarily trying to work as rapidly as possible and therefore cannot take the time required to eliminate all spillage. Furthermore, in measuring the feed to different cows, which require different amounts according to size, milk production, and other factors, the attendant may be inclined to be generous in measuring by eye the portions picked up on the shovel. While the feed lost from this cause at any particular feeding may be negligible, yet it is cumulative over a period of time and in the long run becomes a significant part of the cost of feed.

When feeding by hand involves as high a percentage of hand labor as it does ordinarily, the feeding operation becomes a comparatively expensive one. The elimination of this expense item is highly desirable in the operation of the dairy, provided that the operation can be performed as satisfactorily by mechanical means

2 which is neither prohibitively expensive to install or to operate.

It thus becomes a general object of the invention to provide a mechanical feeder for live stock adapted to dispense measured amounts of feed at the various stalls occupied by a number of head of live stock, thus reducing to a minimum the amount of manual labor and the cost involved in this feeding operation.

It is a further object of the invention to provide a mechanical live stock feeder of the character described which is flexible in its operation in order that the operator may at any time select the location at which feed will be next discharged and can control the amount of feed discharged at any location, within any set range of operation. In this way the flexibility of operation of the device is maintained on a comparable basis with the operation of feeding by hand.

It is a further object of the invention to provide a live stock feeder which eliminates wastage of the feed by eliminating spillage and also by accurately measuring out the desired amounts of food to reduce to a minimum the loss through food dispensed but not eaten.

Another object of the invention is to provide a feeder of the character described which is fully mechanical in its operation of moving from place to place, dispensing the feed and also refilling at the end of the feeding period in order that the feeding will require a minimum amount of time when conducted by such mechanical means.

Another object is to provide a feeder of the character described which is simple in construction and operation, thus entailing a minimum expense to install the device and to maintain and operate it.

These objects of my invention have been attained in my novel live stock feeder in which track means of a suitable character extend along a series of stalls and a feed dispenser is mounted upon said track means in order to be movable to any selected stall. This dispenser consists generally of a bin or hopper holding a quantity of feed which is preferably sufficient to feed all of the cattle in a given series or a row of stalls, and is provided with discharge means adapted to discharge a measured amount of feed from the dispenser. Drive means is provided for moving the dispenser along the track, this drive means preferably being an electric motor which is controlled by a control circuit which includes elements by which the operator may select the next stall at which feed will be dispensed by pre-establishing in the electric control circuit the distance and direction of movement of the dispenser from the point at which it has last discharged feed. The feed discharge means is also operated by an electrical control circuit to operate the discharge means in a way to discharge a predetermined quantity of food after the dispenser has come to rest at the selected stall.

How the above objects and advantages of my invention, as well as others not specifically referred to herein, are attained will be more readily understood by reference to the following description and to the annexed drawings, in which:

Fig. 1 is a fragmentary perspective view showing a cattle feed dispensing means as constructed and installed according to my invention, the traveling dispenser being shown in feed dispensing and filling positions;

Fig. 2 is a schematic perspective of the drive means for propelling the dispensed along the track and the electrical circuit and control means for said drive;

Fig. 3 is a fragmentary transverse vertical section through the dispenser supporting track showing the manner of supporting and driving the dispenser from the track;

Fig. 4 is a vertical cross section through the dispenser and taken on a plane passing transversely and perpendicular to the path of travel;

Fig. 5 is a schematic perspective of the feed discharge means and the means for driving and controlling the operation of the feed discharge;

Fig. 6 is an enlarged elevation of the control panel detached from the dispenser; and Fig. 7 is a schematic vertical section through the means for refilling the traveling dispenser.

Fig. 1 illustrates a typical installation in a modern dairy farm of a feeder constructed according to my invention. A series of stalls 10 is laid out on the barn floor. The stalls are usually arranged in a straight row as here shown, although not necessarily. The cows are maintained in their stalls by stanchions 12, which may be of any conventional design, that pass around the cows neck. Beyond the stanchions is a raised platform 13 having a feed trough 14 parallelling the row of stanchions. The trough is so located that feed can be placed in it and reached by the cow while in the stall.

In order to carry the feed dispenser, suitable track means are provided. A convenient and preferred form of such track is an overhead monorail as at 15. As shown in Fig. 3, rail 15 is preferably of T-shape, but inverted so that the dispenser is supported from the upwardly extending stem of the T. Rail 15 is supported by brackets 16 from suitable parts of the barn or other supporting structure, not shown in the drawings, but which may be of any conventional design. The track means conforms to the layout of stalls 10 and is therefore here a straight track. Since it is desired to deposit feed for the live stock in trough 14, rail 15 is ordinarily located above the trough in a position to discharge the feed at the desired point relative to the trough.

The traveling feed dispenser is indicated at 18 and is generally built in the shape of a hopper in order to hold a quantity of feed. The quantity of feed may be any amount desired, but it is preferable to have a quantity adequate to feed all of the live stock in a single row of stalls in order to eliminate the need for refilling the dispenser during a single feeding operation. Dispenser 18 is suspended from track 15 by two or more hangers 19 and 20 each of which has rotatably mounted upon its upper end a trolley wheel 21. Both wheels 21 are idlers in that neither one of them is driven.

In order to move dispenser 18 along track 15 to positions opposite the successive stalls, suitable drive means is provided, as shown in Figs. 2 and 3. This drive means includes an electric motor 24 which drives shaft 25 through a suitable right angle speed reducer unit 26. On the upper end of drive shaft 25 is bevel gear 27 meshing with a similar bevel gear 28 on a short shaft 29 which is journaled in hanger bracket 19. Also attached to shaft 29 is pinion 30 which meshes with rack 32 fixed to the upper side of the cross member of track 15, as shown particularly in Fig. 3. This driving mechanism is enclosed within housing 18a forming a portion of traveling dispenser 18. It will be apparent that when motor 24 is energized, pinion 30 is rotated about a horizontal axis and by virtue of its meshing engagement with fixed rack 32, the entire dispenser is moved in one direction or the other along rail 15, according to the direction of rotation of pinion 30. In order that the dispenser may be moved in either direction, motor 24 is preferably reversible. The electric circuit and means for controlling the operation of motor 24 and the movement of dispenser 18 will be described later.

As shown especially in Fig. 5, dispenser 18 has a discharge outlet 35 at the bottom. Above this outlet is a valve which controls the movement of feed to the outlet, this valve being preferably in the form of a rotatably mounted member 36 provided with a plurality of radially extending blades or vanes 37. Valve member 36 is here shown as having three such angularly spaced vanes although it will be understood that a different number may be used if desired.

On the end of shaft 38 is mounted bevel gear 40 which meshes with and is driven by a second bevel gear 41 attached to vertically extending shaft 42. Shaft 42 is driven through speed reducer unit 43 from electric motor 44. When motor 44 is energized, it supplies the power for driving, through the mechanism just described, valve member 36; and as the valve member rotates, a measured quantity of feed is carried to discharge outlet 35 as each compartment between two successive vanes 37 passes the discharge outlet. The weight of material in the dispenser causes it to flow downwardly to fill the spaces or compartments between vanes 37 so that each compartment always contains a substantially uniform, measured amount. Consequently, the total amount discharged by valve 36 at any given stall depends upon the number of these valve compartments which pass or are exposed to discharge outlet 35.

Returning now to the control means for the dispenser drive, such control means is shown schematically in Fig. 2. Motor 24 is typically an alternating current motor of any suitable type, although it will be understood that direct current may also be used with suitable modifications to the electric circuit. Motor 24 is started, stopped and reversed by a contactor or reversing starter 46 of conventional design which receives power through wires 45 which are each connected to a shoe 47. The two shoes 47 slide along bare conductors in the form of flat strips 47a mounted on the underside of rail 15 by insulator blocks 47b. Conductors 47a are connected to any suitable source of electricity. The operation of starter 46 is controlled by two separate branch circuits, each branch circuit controlling the direction of movement of dispenser 18 for a given direction. One branch circuit consists of conductors 48 which connect in series normally open switches 49 and 50 and solenoid 51. Switch 49 may be closed by the operation of rotating cam 52 in a manner which will later be described. Switch 50 is adapted for manual control by means of push button 53 which passes through solenoid 51 so that when the solenoid is energized push button 53 is held in the advanced position in which it closes switch 50.

A duplicate branch circuit is provided consisting of conductors 55 which connect in series normally open switches 56 and 57 and solenoid 58. Switch 56 is also adapted for mechanical operation by cam 52, while switch 57 is adapted for manual closure by means of push button 59 which passes through solenoid 58 and is held in the advanced or switch closing position when solenoid 58 is energized.

Conductors 48 and 55 are connected to starter 46 in such a manner that when one of the two sub-circuits is energized, starter 46 causes motor 24 to rotate in a given direction. Push buttons 53 and 59 are placed on control panel 60, as shown in Figs. 2 and 6, to provide manually operated means for controlling or determining the direction of dispenser movement.

The control means for the dispenser drive also includes manually operated means for predetermining the distance to be traveled by the dispenser after it is started on its way to a selected stall. The manual control for this is button 62 also located on control panel 60. Button 62 is fastened to the end of shaft 63 which is mounted in the dispenser housing for both rotational and longitudinal movement. Carried on shaft 63 at a point intermediate its ends and rotated thereby is cam 52 in a position to close either one of switches 49 or 56 as may be selected.

On the inner end of shaft 63 is located bevel gear 64 which meshes with a smaller bevel gear 65 on the lower end of vertical shaft 66. Shaft 66 is rotatably journaled in the frame of dispenser 18, as indicated in Fig. 3, and carries on its upper end star wheel 68 which is here shown as having four arms. Star wheel 68 is located close to and underneath rail 15, as illustrated in Fig. 3, in order that it may engage and be rotated by each of a plurality of stationary fingers 70 which are mounted upon rail 15 or any other stationary supporting means. The spacing between successive fingers 70 is equal to the spacing between successive stalls 10. One finger 70 is provided for each of stalls 10 and is located at a given position relative to the stall in order to control the movement of the dispenser, as will be more fully explained.

Shaft 63 is also mounted for sliding movement longitudinally. This may be accomplished by pushing manually upon button 62 on the outer end of the rod in which case the rod may be moved inwardly a distance sufficient to disengage gears 64 and 65. When the pressure is relieved on button 62, the shaft is automatically returned to the normal position in which gears 64 and 65 are engaged by the force exerted on button 62 by compression spring 72. Compression spring 72 is contained in a recessed housing in the face of control panel 60 and bears against the fixed bottom of the housing and against the inside face of button 62 to resiliently urge shaft 63 to its normal operative position.

In Fig. 2, shaft 63 is shown in its neutral position in which cam 52 is not in engagement with either switch 49 or 56, so that these two switches are open and the branch circuits in which these switches are located are inoperative. When shaft 63 is moved inwardly by pressure on button 62, the shaft may be rotated manually in either direction from the neutral position; and according to its direction of rotation or displacement from the neutral position, either switch 49 or switch 56 is closed. The angular displacement from the neutral position of cam 52 is measured by scale 73 on control panel 60, the scale being graduated in terms of the number of stalls 10 along which it is desired to move dispenser 18. As the dispenser moves along track 15, star wheel 68 is engaged by successive fingers 70, each such engagement causing the star wheel to be rotated one-quarter revolution. This rotation of the star wheel is communicated to cam 52 which is rotated thereby in the direction to return the cam to its neutral position and again restore both switches 49 and 56 to the normally open position.

Shaft 63 and its mounts permitting longitudinal movement constitute means for temporarily disconnecting the star wheel from switch actuating cam 52. In addition to the manual disconnection just described, it may be also disconnected temporarily for a longer period of time by lever arm 75 which swings about a fixed pivot 76 at its lower end to engage collar 77 attached to shaft 63. At its upper end, lever 75 is attached to push rod 78 which extends through to the forward face of control panel 60, as shown in Fig. 2, so that the outer end of the rod provides a manually operable control member.

Pressure applied to the outer end of rod 78 moves the push rod inwardly, pressing lever 75 against collar 77 and moving shaft 63 axially inward to disconnect bevel gears 64 and 65. In order to hold push rod 78 temporarily in this inward position, it passes through solenoid 80 which is connected in series with normally open switch 81 by a pair of conductors 82. For reasons to be explained, it is also desired to add a normally closed limit switch 83 in this branch circuit in series with solenoid 80 and switch 81. Conductors 82 are connected to reversing starter 46 in parallel with either conductors 55 or conductors 48, the choice being determined by considerations which will be mentioned later.

As may be seen from Fig. 2, this mechanism is contained in a housing 84 of which control panel 60 is the front face. This housing is supported on sleeve 79 projecting outwardly from one side of housing 18a and forming a housing for shaft 63.

The electric circuit control means for operating the discharge valve 36 is illustrated in Fig. 4. Power for this circuit and the operation of motor 44 is supplied through a pair of conductors 85 which are connected to any suitable source of electric power, and may be conveniently connected to the same shoes 41 that contact the conductors on the under side of rail 15. One of the conductors 85 has four branches 85a which are connected to switches 86, 87, 88, and 89 so that these switches are arranged in parallel with each other.

Switches 86, 87, 88, and 89 are respectively connected to holding coils 90, 91, 92, and 93 by means of individual parallel conductors 85b. Holding coils 90, 91, 92, and 93 are individually connected by conductors 85c to one of a bank of four switches 95 which are all connected to a common conductor 85d going to solenoid 96. Coils 90, 91, 92, and 93 and switches 95 are located in housing 84. The other terminal of solenoid 96 is connected directly to one terminal of motor 44 of which the other terminal is connected to a conductor 85. Thus there are provided four parallel sub-circuits each consisting of one of the normally closed switches 86, 87, 88, and 89, one of the holding coils 90, 91, 92, 93 and a normally open switch in bank 95. Any one of these four individual parallel circuits is in series with solenoid 96 and motor 44.

Each of solenoids 90, 91, 92 and 93 has a push rod 98 passing through the coil or otherwise associated with it so that when the coil is energized the push rod is held in a position to maintain closed the associated switch of switch bank 95. When the holding coils are de-energized, each push rod 98 is normally returned to the rest position in which the associated switch 95 is opened, by means of the force exerted on the push rod by compression spring 99. The outer end of each rod projects through control panel 60, as shown in Fig. 5, and is appropriately labeled for identification purposes. In this way a selected one of rods 98 may be manually pushed by the operator to close one of the switches 95 to predetermine the manner of operation of the circuit.

Switches 86, 87, 88, and 89 are arranged in a row and equally spaced; and they are normally open switches which are ordinarily held in closed position by means of a common switch operating bar 100. The bar is normally retracted to the rest position shown in Fig. 5 by means of tension spring 101. At the other end of switch operating bar 100 is pivotally mounted latch 102 which is positioned to engage lugs on endless chain 103 which passes around a pair of pulleys 104. One of pulleys 104 is driven by gear train 105 at a suitable rate of speed from drive shaft 42.

Also pivotally connected to latch bar 102 is operating rod 106 which is associated with solenoid 96 in such a way that the control rod can be rendered immobile when the solenoid is energized. Solenoid 96 is mounted upon switch actuating bar 100 to move therewith.

When solenoid 96 is energized, rod 106 is held in the position shown and latch bar 102 is locked in a position substantially transverse to switch bar 100 so that the switch bar is moved longitudinally by virtue of engagement of latch 102 with the lugs on belt 103. As the switch bar is moved in this manner it releases and opens switches 89, 88, 87, and 86 in that order. When solenoid 96 is subsequently de-energized, latch 102 is then free to pivot about its connection with bar 100. Under this condition, the latch bar yields to the pull of spring 101 and allows switch bar 100 to be returned to its normal or initial position, which is the position shown in Fig. 5. As the bar returns, it again closes switches 86, 87, 88, and 89.

Assuming discharge valve 36 to have three vanes 47, the ratio of the gears is so designed that one-third of a revolution of shaft 38 is accompanied by a movement of belt 103 equal to the spacing between successive lugs on the belt. Likewise, it is convenient to make the spacing between switches 86, 87, 88, and 89 equal to the spacing between the belt lugs, as this simplifies the design and movement of the parts. As a result, one-third revolution of shaft 38, which is sufficient to bring one feed compartment between two successive vanes into registry with outlet 35, causes bar 100 to be advanced sufficiently to open switch 89. Similarly if shaft 38 rotates sufficiently to bring two compartments filled with feed past outlet 35, belt 103 advances for the spacing of two lugs and bar 100 is carried forward a distance sufficient to release and open switch 88. And so on for any given angular movement of shaft 38 for as many switches as it is desired to provide. Only four switches are here provided since it is assumed that bringing four compartments between vanes 37 into successive positions above outlet 35 deposits the maximum amount of live stock food that it is desired to discharge at any one time.

The circuit is initially energized by pressing a selected button 98 which closes the corresponding switch 95 and one of the sub-circuits, thus starting motor 44 which drives discharge valve 36. Energizing the sub-circuit also energizes the associated holding coil and keeps the depressed button 98 in operating position. The electric control circuit is subsequently de-energized by opening in this manner the one of switches 89, 88, 87, or 86 that is in series with the button 98 which was pressed. At the same time the associated holding coil is de-energized and the depressed button 98 returns to normal. The opening of one of the switches as a result of the movement of switch operating bar 100 stops motor 44 after a definite angular movement of shaft 42 and thereby controls the angular movement of discharge valve 36 and in turn controls the quantity of food deposited by the discharge means.

Since it will be necessary to refill dispenser 18 from time to time, I prefer to provide such refilling means at one end of track means 15. The refilling means is shown in Figs. 1 and 7 and comprises generally column 110 which is hollow and provides the casing for screw conveyor 111 which is adapted to raise food from storage beneath the dairy floor, not shown in the drawings, and deliver the feed into bin 112 which is supported on the upper end of column 110. Screw conveyor 111 is driven by motor 114 through a suitable gear train at 115, the driven gear of the train being mounted upon the end of the central shaft of the screw conveyor which extends above bin 112 for this purpose. Motor 114 is designed to operate the screw conveyor until the level of feed in bin 112 has reached some such level as indicated by dotted line 116 at which time the feed operates switch 117, in series in the power supply circuit 118 of the drive motor, to interrupt the power to the motor and stop conveyor 111. Switch 117 may be of any suitable type as for example a pressure-sensitive switch operated by the weight of the feed when it exceeds a certain height in the bin.

Rail 15 extends sufficiently beyond the end of the row of stalls that dispenser 18 can be brought to a position underneath bin 112. The bin is provided at its bottom with a simple form of slide valve 120 which is a position to be engaged and be moved aside by dispenser 18 as it moves into position beneath the bin. When slide 120 is completely retracted to the dotted line position of Fig. 7, the discharge opening at the bottom of bin 120 is opened and the accumulated feed in the bin falls by gravity into dispenser 18 through the open top of the dispenser. As the dispenser moves away from bin 112, slide valve 120 is closed in any suitable manner, as by spring 121 to hold within bin 112 feed in excess of the quantity required to fill dispenser 18.

Having described the preferred construction of my novel form of live stock feeder and the operation of the various parts, operation of the entire installation will now be briefly described.

For this purpose it is convenient to assume that the cycle of operation commences with dispenser 18 at a position opposite some stall 10 and after the dispenser has discharged a quantity of feed at that stall. At this time, the attendant now desires to move the dispenser to another stall where a predetermined measured amount of feed will be discharged.

It may be assumed that the first operation on the part of the attendant is to select the stall to which he desires the dispenser to be moved from the point at which the dispenser is then at rest. This is done by manually depressing button 62, thus disengaging gears 64 and 65 so that shaft 63 is free to turn in either direction from the neutral position shown in Fig. 2. The operator manually rotates the shaft by push button 62 in either direction accordingly as he desires to move the dispenser in one direction or the other from its position of rest. The distance which it is desired to have the dispenser travel is determined by the angular displacement of shaft 63 and cam 52 from the neutral position shown. This can be determined with the aid of scale 73 which is preferably graduated in units of stalls 10 to indicate the number of stalls the dispenser is to travel. For example, if it is desired to move the dispenser five stalls to the right from its point of rest, button 62 is rotated clockwise until the pointer 62a on the button is opposite the numeral "5" on scale 73, as shown in dotted lines in Fig. 2.

Normally, the attendant starts his milking operation at or near one end of the series of stalls and progresses in general toward the other end. However, for any one of a number of obvious and well-known reasons he may not wish to move the dispenser only one stall at a time to each successive stall. Rather, he may desire to skip some and move the the dispenser from a point of rest to a stall several stalls distant. To accomplish this, the mechanism has been designed to move as many as eight stalls in either direction and scale 73 is graduated accordingly; but it is to be understood that a greater or lesser range of movement may be incorporated in the device as desired. It is easily possible to move a greater distance than eight stalls by first moving the full range, and subsequently moving the dispenser for all or part of the full range of normal movement.

Likewise, if the attendant has skipped one or more stalls in progressing in one direction, he may desire to reverse the direction of movement of the dispenser and come back to one of the stalls previously skipped. For this reason, the device is designed to be moved in either direction from a point of rest. It also permits movement with equal facility from either end of a series of stalls.

Having set the pointer on button 62 opposite the desired stall, the operator releases the pressure on button 62, allowing gears 64 and 65 to be re-engaged by the longitudinal movement of the control shaft under the force of spring 72. By the manual rotation of shaft 63, cam 52 has been brought into engagement with either one of switches 49 and 56, closing one of these switches. In the assumed example, switch 56 has been closed as the dispenser is to be moved to the right from its point of rest.

When the operator desires to place the dispenser in motion, he presses one of buttons 53 or 59, according to the direction of movement desired. When movement is to the left, button 53 is depressed; when movement is to the right, button 59 is depressed. In our assumed example, button 59 is depressed, thus closing switch 57 and energizing the branch circuit containing conductors 55 which in turn actuates motor starter 46 in a manner to start motor 24 in the direction required to move dispenser 18 to the right of the attendant. Button 59 is held in position to close switch 57 by solenoid 58. Power is transmitted from the motor through shaft 25 to driving pinion 30 which rotates in engagement with rack 32 to move dispenser 18 to the right. As the dispenser travels along the track means, each increment of travel equivalent to the spacing between successive stalls 10 brings a finger 70 into engagement with an arm of star wheel 68 causing rotation of cam 52 in a direction opposite to the direction of movement of the cam under the manual manipulation of the attendant. Each actuation of star wheel 68 produces rotation of shaft 63 sufficient to move pointer backwards (i. e. toward the zero or neutral position) one division on scale 73. Thus when the dispenser has moved to the right for a distance equal to the spacing of five stalls, cam 52 has been returned to its neutral position in which switch 56 is again opened. Opening switch 56 de-energizes the branch control circuit and causes starter 46 to stop motor 24, thus stopping the dispenser at the desired stall. De-energization of the branch control circuit having leads 55 also de-energizes solenoid 58, allowing push button 59 to be restored to its normal position and likewise allowing switch 57 to be restored to the open position. All the parts in the circuit have now been restored to their initial positions with the pointer on push button 62 again at zero on scale 73.

Discharge of feed after the dispenser comes to rest is controlled by a separate circuit control means, shown in Fig. 5. This action may take place after the dispenser comes to rest at the new location. The amount of feed to be discharged is selected and set in the machine by the operator as he punches one of buttons 98 which are identified by numerals "1," "2," "3," and "4" to indicate the number of compartments between vanes 37 to be moved past outlet 35. Assume the operator depresses button 98 labeled "2." The associated switch of bank 95 is closed, energizing solenoids 91 and 96 and motor 44 since these are in series in one circuit. Switch 88 in series is closed by bar 100. Rotation of dispensing valve 36 by shaft 42 is accompanied by movement of belt 103 which pulls bar 100 to the left in Fig. 5. The movement of the switch bar is coordinated with the rotation of shaft 38 so that switch 88 is opened when shaft 38 is turned two-thirds of a revolution—or any other angular movement according to the number of vanes 37 on the shaft. Two-thirds of one revolution of shaft 38 dumps through outlet 35 two units of feed, each unit being the amount held between two successive vanes 37. More or less feed is discharged by pressing another button 98. When the proper amount of feed has been dispensed, switch 88 opens to open the circuit. Motor 44 stops, solenoid 91 is de-energized to allow button 98 to resume its normal position, and solenoid 96 is de-energized to let bar 100 return to its rest position under the pull of spring 101.

If it is desired to refill dispenser 18, button 78 is pressed. This moves lever 75 to close switch 81 and start motor 24 through starter 46. In addition, lever 75 disengages gears 64 and 65 so that shaft 63 is not turning as the dispenser travels. The refilling apparatus is shown at the right hand end of the series of stalls 10 in Fig. 1; and so conductors 82 are connected to starter 46 in parallel with conductors 55 to move the dispenser to the right when button 78 is depressed. Movement of the dispenser to the other end of the stalls can be had by connecting wires 82 in parallel with wires 48. Movement of the dispenser is stopped by opening limit switch 83 at an appropriate point in the dispenser travel.

As the dispenser reaches the end of its travel, it engages and opens slide valve 120, allowing feed in bin 112 to flow by gravity into the dispenser. When the filled dispenser moves away from the filling position, valve 120 is closed by spring 121 or any other suitable means. Movement of the dispenser away from the refilling position (to the left here) is accomplished by manipulating button 62 to move the dispenser to the first or a succeeding stall.

Having shown and described a preferred form of my invention, it will be understood that various changes may be made in the location and arrangement of the parts without departing from the spirit and scope of my invention. This is especially true of the electrical circuits wherein relays of various types can be employed. Thus switch 50 and solenoid 51 can be replaced by a suitable relay performing a similar function; but I have shown the basic elements to illustrate the function of the circuit and its operation. For these reasons, I wish it understood that the foregoing description is considered illustrative of, rather than limitative upon the appended claims.

I claim:

1. In a travelling feed dispenser construction for delivering feed to a plurality of spaced stations, the combination comprising: a travelling feed dispenser holding a quantity of feed to be dispensed; means for supporting and directing the dispenser for travel to the plurality of stations; drive means for moving the dispenser along said support means; discharge means on the dispenser; metering valve means at the discharge means for measuring a predetermined quantity of feed to be discharged from said discharge means while positioned at any one of said stations; electric control circuit means actuating and controlling the dispenser drive means to move the dispenser; and means carried with said dispenser and associated with said circuit means for predetermining the distance and direction travelled by the dispenser from any one station to stop the dispenser automatically at any other preselected station preparatory to discharging feed at said preselected station.

2. A travelling feed dispenser construction as in claim 1 in which the electric control circuit includes switch means movable to a position in which the circuit is deenergized; and the means for predetermining the travel of the dispenser includes a member moving in proportion to the travel of the dispenser and engaging said switch means to move it to the deenergizing position after a predetermined amount of travel of said member.

3. A travelling feed dispenser construction as in claim 2 in which the means for predetermining the travel of the dispenser includes a star wheel rotatably mounted on the dispenser to travel therewith, a series of fixed members each engaging the star wheel as it passes the member, and a cam operatively connected to said star wheel to rotate in direction and amount according to the travel of the dispenser and cooperating with the switch means in the electric control circuit to deenergize the circuit after a predetermined rotation of the cam.

4. A travelling feed dispenser construction as in claim 3 that also includes means for temporarily disconnecting the star wheel from the switch actuating cam.

5. A travelling feed dispenser construction as in claim 1 in which the means for predetermining the travel of the dispenser includes manually set means cooperating with the electric circuit to move the dispenser the entire distance to one end of the supporting means from any one of said stations without intermediate stops.

6. A travelling feed dispenser construction as in claim 1 in which the dispenser has an outlet at the bottom, and the metering valve comprises a member having a plurality of angularly spaced vanes and rotatably mounted at the outlet of the dispenser to receive feed as each compartment between successive vanes passes said outlet, said valve delivering a measured amount of feed to the discharge means.

7. In a travelling feed dispenser construction for delivering feed to a plurality of spaced stations, the combination comprising: a travelling feed dispenser holding a quantity of feed to be dispensed; means for supporting and directing the dispenser for travel to the plurality of stations; drive means for moving the dispenser along said support means; discharge means on the dispenser; metering valve means at the discharge means for measuring a predetermined quantity of feed to be discharged from said discharge means while positioned at any one of said stations; and electric circuit control means carried with the dispenser operatively and intermittently associated with the metering valve for a predetermined period of time to measure a predetermined quantity of feed to be discharged at any one of said stations, said electric circuit control means including means for varying the length of said period of time.

8. A travelling feed dispenser construction as in claim 7 in which the metering valve comprises a member having a plurality of equi-angularly spaced vanes rotatably mounted on the dispenser, and the means actuating the metering valve including means operatively associated with and rotating the vaned member through varying angles differing by the angular spacing between successive vanes.

9. A traveling feed dispenser construction for delivering feed to a plurality of spaced stations, the combination comprising: a travelling feed dispenser holding a quantity of feed to be dispensed; means for supporting and directing the dispenser for travel to the plurality of stations; drive means for moving the dispenser along said support means; a rotatably mounted valve member on the travelling dispenser having a plurality of angularly spaced vanes for measuring an amount of feed to be discharged from the dispenser; means controlling operation of the dispenser drive means; electric motor means on the travelling dispenser operatively connected to the rotary valve to rotate it; a plurality of spaced switches mounted on the travelling dispenser in parallel with each other and in series with the motor; a common switch operating member movable to operate the switches in succession; and means operatively connected to the valve member to move the switch operating member in response to rotation of the valve member.

10. In a travelling feed dispenser construction for delivering feed to a plurality of spaced stations, the combination comprising: a travelling feed dispenser holding a quantity of feed to be dispensed; means for supporting and directing the dispenser for travel to the plurality of stations; drive means for moving the dispenser along said support means; discharge means on the dispenser; metering valve means at the discharge means on the dispenser for measuring an amount of feed to be discharged from said discharge means; control means controlling operation of the dispenser drive means; means carried with said dispenser and electrically associated with said control means for predetermining the distance and direction travelled by the dispenser from any one station to stop the dispenser automatically at any other preselected station; and means mounted on the travelling dispenser actuating the metering valve means for a predetermined period of time to measure a predetermined quantity of feed to be discharged while positioned at said preselected station.

References Cited in the file of this patent

UNITED STATES PATENTS

| Number | Name | Date |
|---|---|---|
| 599,935 | Griffis | Mar. 1, 1898 |
| 1,392,311 | Egeland | Oct. 4, 1921 |
| 1,607,899 | Long | Nov. 23, 1926 |
| 1,624,245 | Holmes et al. | Apr. 12, 1927 |
| 2,024,320 | Walker | Dec. 17, 1935 |
| 2,068,888 | Patten | Jan. 26, 1937 |
| 2,080,535 | Devers | May 18, 1937 |
| 2,168,639 | Yeaman | Aug. 8, 1939 |
| 2,536,621 | Arnold | Jan. 2, 1951 |
| 2,565,801 | Byers | Aug. 28, 1951 |
| 2,601,057 | Roberts et al. | June 17, 1952 |
| 2,615,424 | Spickler | Oct. 28, 1952 |